(12) United States Patent
Swain

(10) Patent No.: US 11,027,822 B2
(45) Date of Patent: Jun. 8, 2021

(54) CONTROL SYSTEM FOR TOUCHLESS OPERATION OF MECHANICAL INPUT DEVICES

(71) Applicant: Rockwell Collins, Inc., Cedar Rapids, IA (US)

(72) Inventor: Sangram Keshari Swain, Bangalore (IN)

(73) Assignee: Rockwell Collins, Inc., Cedar Rapids, IA (US)

( * ) Notice: Subject to any disclaimer, the term of this patent is extended or adjusted under 35 U.S.C. 154(b) by 252 days.

(21) Appl. No.: 16/014,570

(22) Filed: Jun. 21, 2018

(65) Prior Publication Data

US 2019/0389563 A1 Dec. 26, 2019

(51) Int. Cl.
| | |
|---|---|
| *B64C 13/20* | (2006.01) |
| *G06K 9/00* | (2006.01) |
| *G01S 7/04* | (2006.01) |
| *G01S 13/88* | (2006.01) |
| *G06F 3/01* | (2006.01) |

(52) U.S. Cl.
CPC ............... *B64C 13/20* (2013.01); *G01S 7/04* (2013.01); *G01S 13/88* (2013.01); *G06F 3/017* (2013.01); *G06K 9/00389* (2013.01); *B60K 2370/146* (2019.05); *B60K 2370/1464* (2019.05); *G05D 2201/0213* (2013.01); *G06F 3/013* (2013.01)

(58) Field of Classification Search
CPC .... G05D 1/0255; G05D 1/0257; G05D 1/101; G05D 2201/0213; G06F 3/017; G06F 3/0346; G06F 3/013; G06F 3/0482; B60W 2554/00; B60W 50/10; B60W 2420/52; H04W 12/00508; G01S 13/88; G01S 13/56; G01S 7/04; G01S 13/34; G01S 13/867; G01S 7/412; G01S 7/415; B60K 2370/146; B60K 2370/1464; B60K 2370/48; B60K 2370/589

See application file for complete search history.

(56) References Cited

U.S. PATENT DOCUMENTS

| | | | |
|---|---|---|---|
| 8,743,052 B1* | 6/2014 | Keller | G06F 3/017 345/156 |
| 9,725,098 B2* | 8/2017 | Abou-Nasr | G06K 9/00355 |
| 10,152,584 B2* | 12/2018 | Einberg | G06F 21/34 |
| 10,576,328 B2* | 3/2020 | Santra | A63B 22/02 |
| 10,726,658 B1* | 7/2020 | Kim | G07F 11/00 |

(Continued)

FOREIGN PATENT DOCUMENTS

GB    2560322 A  *  9/2018 ......... H03K 17/9645

*Primary Examiner* — Olumide Ajibade Akonai
(74) *Attorney, Agent, or Firm* — Suiter Swantz pc llo

(57) ABSTRACT

Systems and methods for touchless operation of mechanical input devices are disclosed. In embodiments, a control system includes a mechanical input device, a RADAR sensor, and a controller in communication with the mechanical input device and the RADAR sensor. The RADAR sensor is in proximity to the mechanical input device and configured to track user hand and finger movements. The controller is configured to detect a gesture indicating a user action corresponding to a manipulation of the mechanical input device based on the user hand and finger movements tracked by the RADAR sensor. The controller is further configured to generate a control signal based upon the user action.

8 Claims, 11 Drawing Sheets

(56) References Cited

U.S. PATENT DOCUMENTS

| | | | |
|---|---|---|---|
| 2011/0260963 A1* | 10/2011 | Timmons | G06F 3/014 |
| | | | 345/156 |
| 2015/0177842 A1* | 6/2015 | Rudenko | G06F 21/32 |
| | | | 345/156 |
| 2015/0346836 A1* | 12/2015 | Schlittenbauer | G06F 3/017 |
| | | | 345/156 |
| 2016/0018891 A1* | 1/2016 | Levesque | G06F 3/04883 |
| | | | 345/174 |
| 2017/0060254 A1* | 3/2017 | Molchanov | G06N 3/0454 |
| 2018/0046255 A1* | 2/2018 | Rothera | B60K 35/00 |
| 2018/0196501 A1* | 7/2018 | Trotta | B60R 25/245 |
| 2019/0210615 A1* | 7/2019 | Caron | B60W 50/14 |
| 2019/0302895 A1* | 10/2019 | Jiang | G06K 9/00389 |
| 2020/0331486 A1* | 10/2020 | Wieczorek | G06K 9/00845 |

* cited by examiner

CONTROL SYSTEM FOR TOUCHLESS OPERATION OF MECHANICAL INPUT DEVICES

BACKGROUND

Aircrafts and other vehicles include control systems, typically with several mechanical input devices (e.g., buttons, knobs, switches, and so forth). In some vehicles (e.g., aircrafts), there are many input devices, displays, and gauges. Consequently, some of the mechanical input devices may be located in hard to reach places. This can result in an operator (e.g., pilot) having to reach for distantly located controls while attempting to monitor several displays and/or gauges. To prevent operator discomfort and/or unsafe vehicle operation, there is a need for systems and methods that facilitate the operation of mechanical input devices from a distance.

SUMMARY

In an aspect, embodiments of the inventive concepts disclosed herein are directed to a control system for touchless operation of a mechanical input device. In embodiments, the control system includes a mechanical input device, a RADAR sensor, and a controller in communication with the mechanical input device and the RADAR sensor. The RADAR sensor is in proximity to the mechanical input device and configured to track user hand and finger movements. The controller is configured to detect a gesture indicating a user action corresponding to a manipulation of the mechanical input device based on the user hand and finger movements tracked by the RADAR sensor. The controller is further configured to generate a control signal based upon the user action.

In further embodiments, the control system includes a plurality of mechanical input devices, a plurality of RADAR sensors, and a controller in communication with the mechanical input devices and the RADAR sensors. The controller can be configured to detect a first gesture indicating a user selection of a particular mechanical input device of the plurality of mechanical input devices based on the user hand and finger movements tracked by the plurality of RADAR sensors. The controller can be further configured to detect a second gesture indicating a user action corresponding to a manipulation of the selected mechanical input device based on the user hand and finger movements tracked by the plurality of RADAR sensors. The controller can be further configured to generate a control signal based upon the user action.

In another aspect, embodiments of the inventive concepts disclosed herein are directed to a method for touchless operation of a mechanical input device. The method includes tracking user hand and finger movements with one or more RADAR sensors. The one or more RADAR sensors can be used to detect a first gesture indicating a user selection of a mechanical input device based on the user hand and finger movements tracked by the one or more RADAR sensors. The one or more RADAR sensors can also be used to detect a second gesture indicating a user action corresponding to a manipulation of the mechanical input device based on the user hand and finger movements tracked by the one or more RADAR sensors. A control signal can be then be generated based upon the user action.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
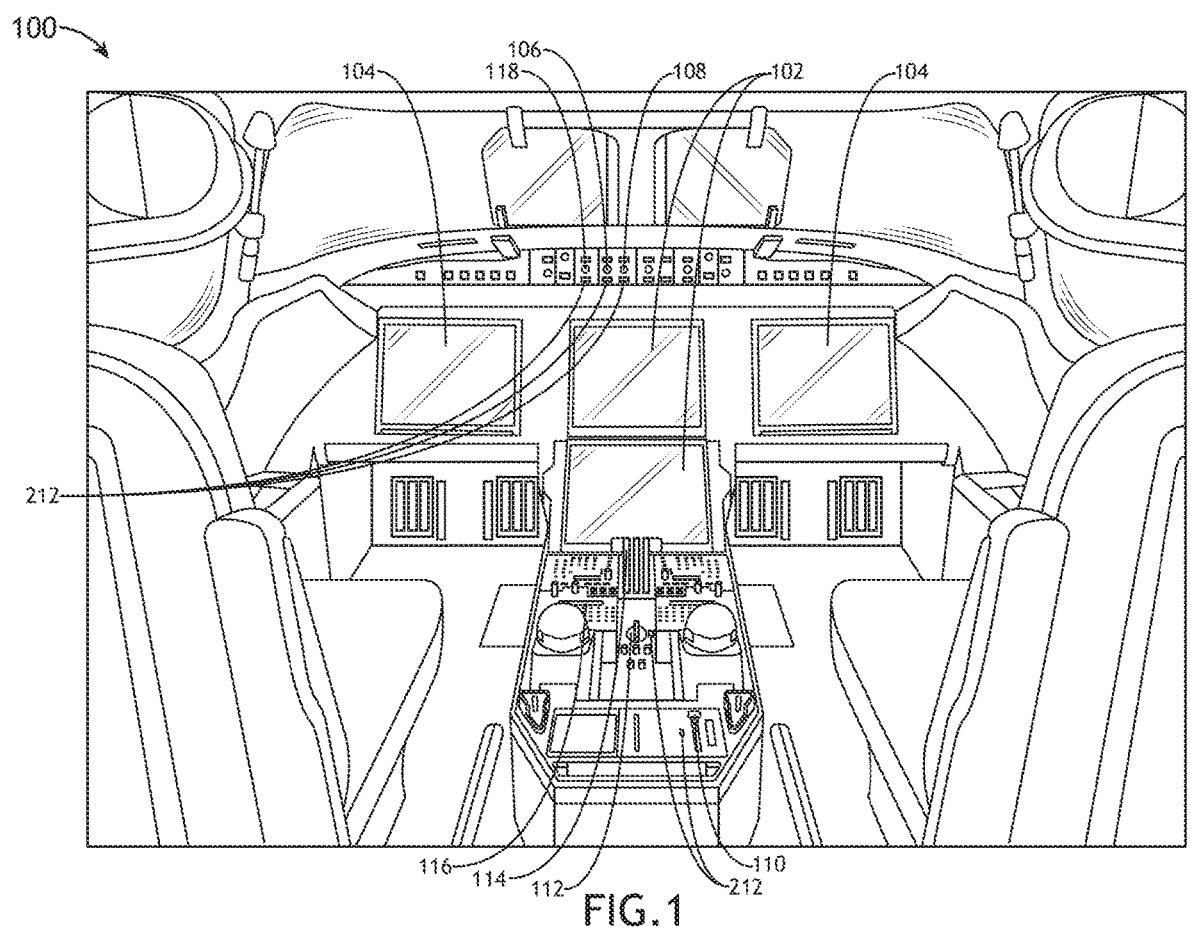
FIG. 1 is an illustration of an aircraft environment in which a control system for touchless operation of a mechanical input device may be implemented, in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a control system and a method that facilitate touchless operation of a mechanical input device. Pilots and other vehicle operators must often focus on several instruments simultaneously, and their focus shifts while operating mechanical input devices (e.g., buttons, knobs, switches, and so forth). For example, they may need to look at input devices located overhead or below their line of sight. Sometimes pilots are even forced to shift between positions to reach distantly located mechanical input devices. Furthermore, the mechanical input devices in an aircraft or any other vehicle may be begin to fail due to wear and tear resulting from continuous and/or excessive direct contact. An object of the control system and method disclosed herein is to reduce the need for direct contact with mechanical input devices by employing radio detection and ranging (RADAR) sensors to track and recognize dynamic gestures expressed by fine hand and finger motions.

In accordance with embodiments of this disclosure, a control system includes at least one mechanical input device and at least one RADAR sensor located in proximity to the mechanical input device and configured to track user hand and finger movements. Gestures indicating user actions corresponding to selection and/or manipulation of the mechanical input device can be detected by the control system based on the user hand and finger movements tracked by the RADAR sensor. Control signals can then be generated based upon the user actions, without the user ever having to directly engage the mechanical input device.

FIG. 1 illustrates an example embodiment of an aircraft environment 100 in which a control system and a method for touchless operation of a mechanical input device may be implemented. In embodiments, the aircraft environment 100 (e.g., a cockpit) includes a plurality of mechanical input devices, such as, but not limited to, pushbutton switches 106, knobs 108, selector switches 110, dials 112, joysticks 114, sliders 116, toggle switches 118, and combinations thereof. The aircraft environment 100 may further include one or more displays that can be employed to present electronic maps, aircraft data, communications, alerts, and so forth. The aircraft environment 100 in FIG. 1 is shown to include multi-function displays 102 and flight displays 104 that are viewable by one or more flight crew members (e.g., pilots). The aircraft environment 100 illustrated in FIG. 1 illustrates an example embodiment. However, in other embodiments, the aircraft 100 environment can include any number of mechanical input devices and/or display devices.

Figure 2A:
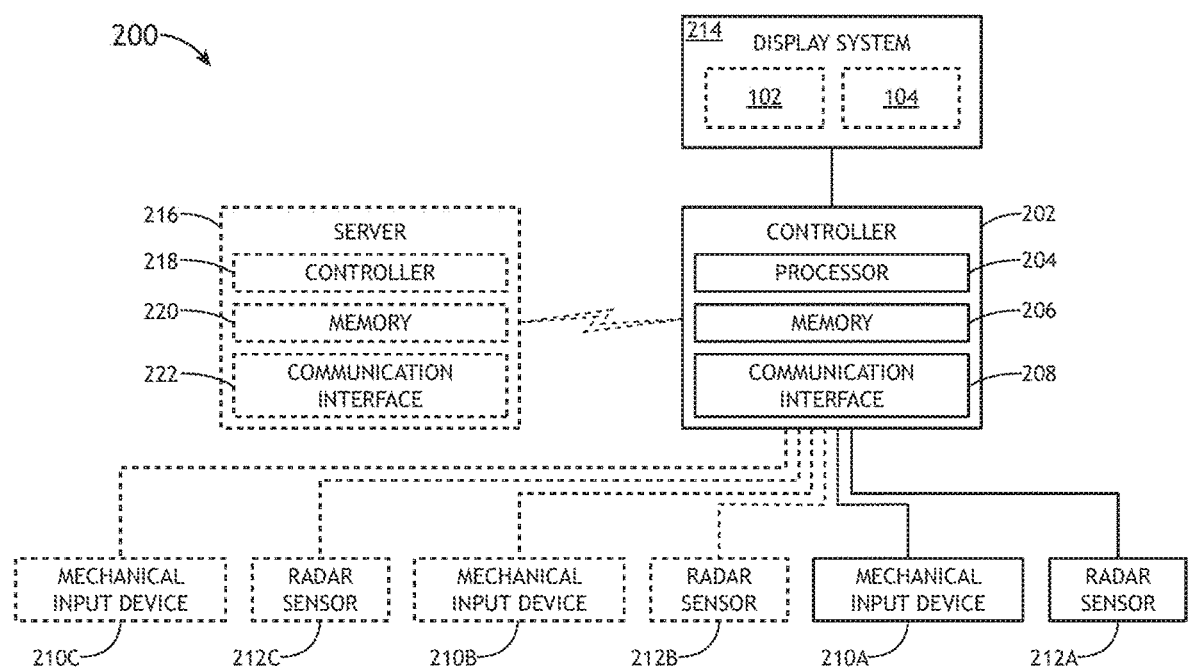
FIG. 2A is a block diagram illustrating a control system for touchless operation of a mechanical input device, in accordance with example embodiments of this disclosure.
Figure 2B:
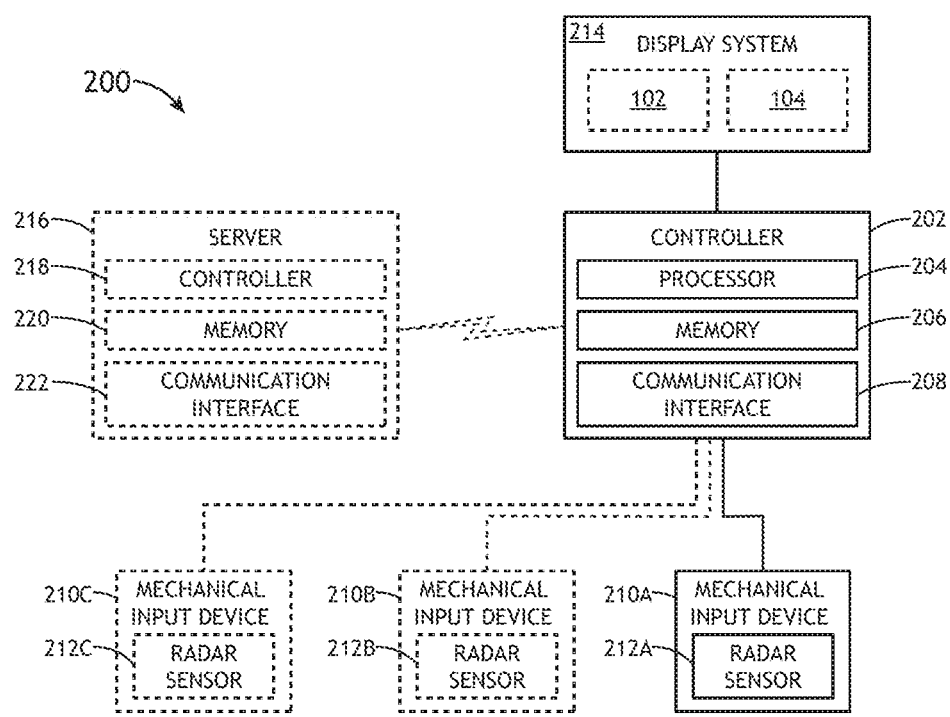
FIG. 2B is a block diagram illustrating a control system for touchless operation of a mechanical input device, in accordance with example embodiments of this disclosure.
Figure 3:
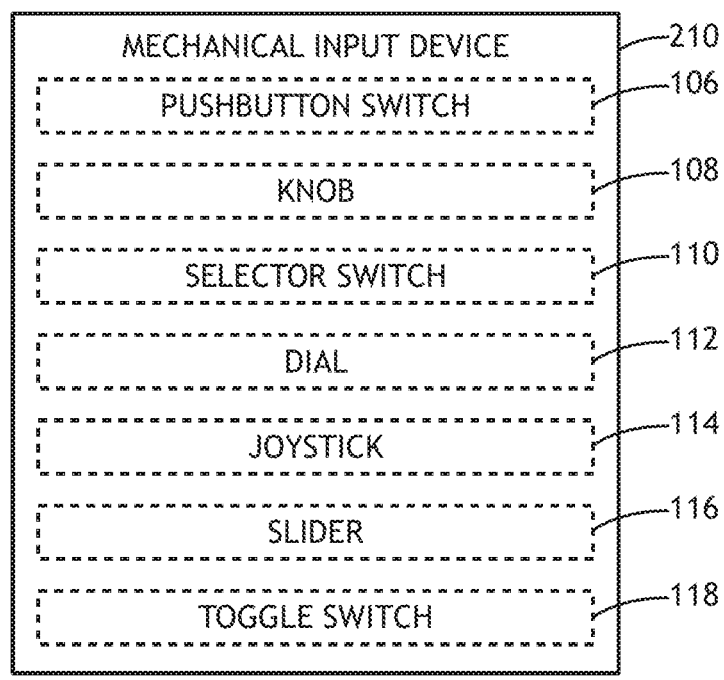
FIG. 3 is a block diagram illustrating a mechanical input device, in accordance with example embodiments of this disclosure.
Figure 4:
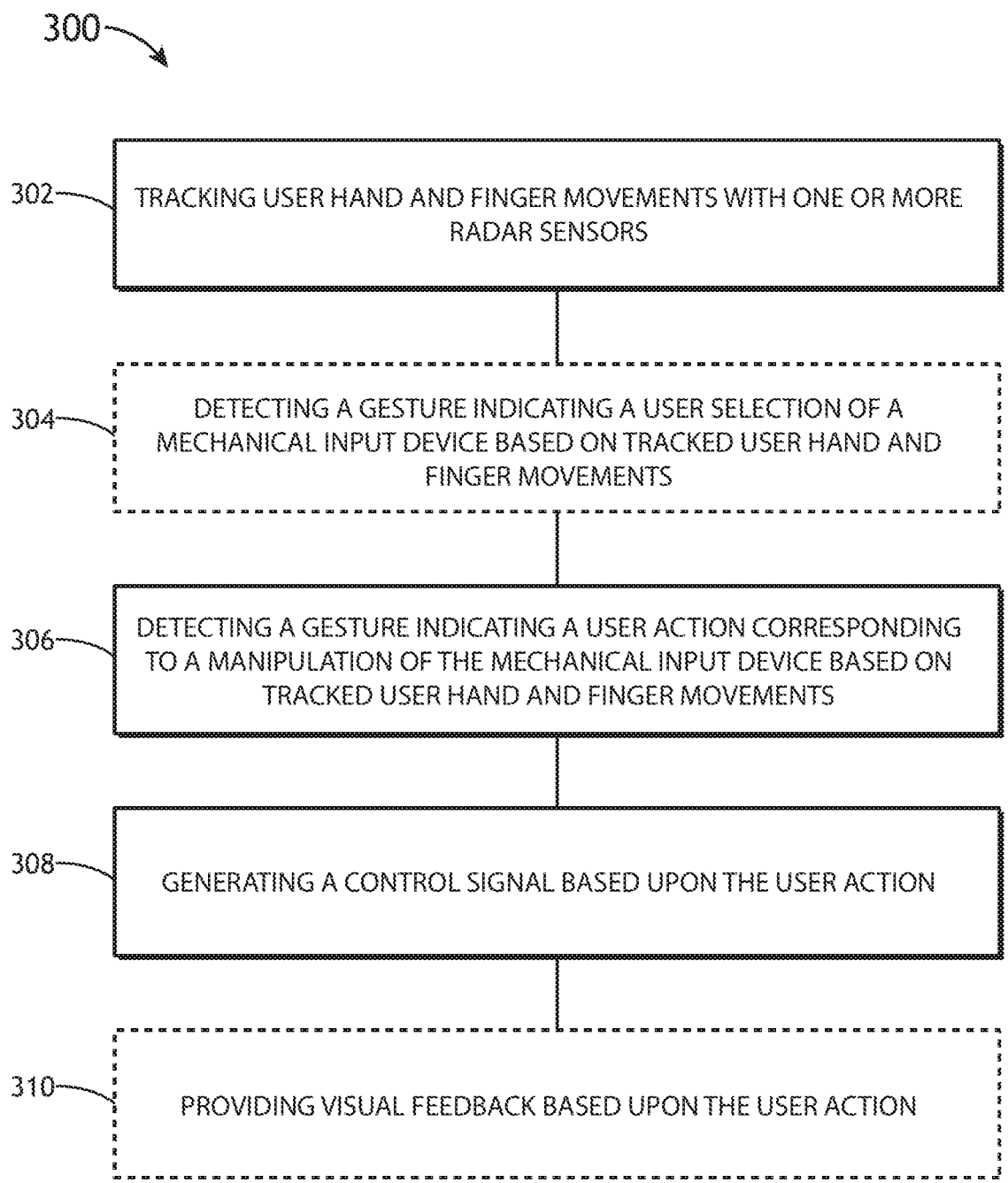
FIG. 4 is a flow diagram illustrating an example implementation of a method for touchless operation of a mechanical input device.

FIGS. 2A and 2B illustrate example embodiments of a control system 200 that facilitates touchless operation of one or more mechanical input devices 210. In embodiments, the control system 200 includes at least one controller 202 that is communicatively coupled to one or more mechanical input devices 210. For example, the controller 202 can be communicatively coupled to at least one mechanical input device 210A. In some embodiments, the controller 202 is further coupled with a second mechanical input device 210B, possibly a third mechanical input device 210C, and so on. In general, the controller 202 can be communicatively coupled with any number of mechanical input devices 202. As shown in FIG. 3, a mechanical input device 210 can be, but is not limited to, a pushbutton switch 106, knob 108, selector switch 110, dial 112, joystick 114, slider 116, or toggle switch 118. Furthermore, any combination of mechanical input devices 210 can be employed. For example, mechanical input devices 210A, 210B, and 210C can all be the same type of mechanical input device 210 or can include a combination of different types of mechanical input devices 210.

The control system 200 further includes one or more RADAR sensors 212 communicatively coupled to the controller 202. For example, as shown in FIG. 1, the one or more RADAR sensors 212 can be disposed in proximity to (e.g., near, adjacent to, and/or at least partially integrated within the structures of) respective ones of the mechanical input devices 210 (e.g., pushbutton switches 106, knobs 108, selector switches 110, dials 112, joysticks 114, sliders 116, toggle switches 118, or any combination thereof). FIG. 2A illustrates embodiments of the control system 200 with the one or more RADAR sensors 212 disposed near or adjacent to respective ones of the one or more mechanical input devices 210. For example, the controller 202 can be communicatively coupled to at least one RADAR sensor 212A associated with mechanical input device 210A. In some embodiments, the controller 202 is further coupled with a second RADAR sensor 212B associate with a second mechanical input device 210B, possibly a third RADAR sensor 212C associated with a third mechanical input device 210C, and so on. As shown in FIG. 2B, in other embodiments, the RADAR sensors 212 can be integrated within the mechanical input device 210 structures. For example, a RADAR sensor 210 may be at least partially embedded within a mechanical input device 210 or an associated device structure (e.g., casing, bezel, or the like).

The control system 200 may include RADAR sensors 210 arranged in a combination of the embodiments illustrated in FIGS. 2A and 2B. For example, in some embodiments, at least one RADAR sensor 212 is disposed adjacent or near to a respective mechanical input device 210 associated with the RADAR sensor 212 (e.g., as shown in FIG. 2A), and at least one other RADAR sensor 212 is integrated within a mechanical input device 210 associated with the other RADAR sensor 212 (e.g., as shown in FIG. 2B).

The controller 202 may be configured to collect signals from one RADAR sensor corresponding to a particular mechanical input device 210 or from a plurality of RADAR sensors 210. In some embodiments, the controller 202 may be configured to detect user actions/gestures based on the signals from the plurality of RADAR sensors 210. For example, the controller 202 may be configured to detect a user action/gesture at least partially based upon a comparison of the signals and/or signal components (e.g., x, y, and/or z components) of the signals from the plurality of RADAR sensors 210. In some embodiments, at least one RADAR sensor 212 associated with one mechanical input device 210 can inform the detection of user actions/gestures for another mechanical input device 210. For example, hand and finger movements detected by RADAR sensor 212A may be used to detect user actions/gestures corresponding to mechanical input device 210B and/or mechanical input device 210C.

While FIGS. 2A and 2B illustrate embodiments of the control system 200 with RADAR sensors 212 corresponding to respective ones of the mechanical input devices 210, in other embodiments, at least one RADAR sensor 212 can correspond to a plurality of mechanical input devices 210. For example, a RADAR sensor 212 can be configured to detect hand and finger movements (e.g., user actions/gestures) for two or more of the mechanical input devices 210.

In embodiments, the controller 202 includes a processor 204, memory 206, and a communication interface 208. The processor 204 provides processing functionality for at least the controller 202 and can include any number of processors, micro-controllers, circuitry, field programmable gate array (FPGA) or other processing systems, and resident or external memory for storing data, executable code, and other information accessed or generated by the controller 202. The processor 204 can execute one or more software programs embodied in a non-transitory computer readable medium (e.g., memory 206) that implement techniques described herein. The processor 204 is not limited by the materials from which it is formed or the processing mechanisms employed therein and, as such, can be implemented via semiconductor(s) and/or transistors (e.g., using electronic integrated circuit (IC) components), and so forth.

The memory 206 can be an example of tangible, computer-readable storage medium that provides storage functionality to store various data and/or program code associated with operation of the controller 202/processor 204, such as software programs and/or code segments, or other data to instruct the processor 204, and possibly other components of the controller 202, to perform the functionality described herein. Thus, the memory 206 can store data, such as a program of instructions for operating the controller 202, including its components (e.g., processor 204, communication interface 208, etc.), and so forth. It should be noted that while a single memory 206 is described, a wide variety of types and combinations of memory (e.g., tangible, non-transitory memory) can be employed. The memory 206 can be integral with the processor 204, can comprise stand-alone memory, or can be a combination of both. Some examples of the memory 206 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 208 can be operatively configured to communicate with components of the controller 202. For example, the communication interface 208 can be configured to retrieve data from the processor 204 or other devices (e.g., mechanical input devices 210 and RADAR sensors 212), transmit data for storage in the memory 206, retrieve data from storage in the memory 206, and so forth. The communication interface 208 can also be communicatively coupled with the processor 204 to facilitate data transfer between components of the controller 202 and the processor 204. It should be noted that while the communication interface 208 is described as a component of the controller 202, one or more components of the communication interface 208 can be implemented as external components communicatively coupled to the controller 202 via a wired and/or wireless connection. The controller 202 can also include and/or connect to one or more input/output (I/O) devices (e.g., via the communication interface 208), such as a display system 214 (e.g., including display 102 and/or display 104), mechanical input devices 210, RADAR sensors 212, other input devices (e.g., a mouse, a trackball, a trackpad, a joystick, a line select device, a touchpad, a touchscreen, a keyboard, a keypad, a microphone (e.g., for voice commands)), and so forth. In embodiments, the communication interface 208 includes or is coupled to a transmitter, receiver, transceiver, physical connection interface, or any combination thereof.

In some embodiments, the communication interface 208 may facilitate connectivity between the controller 202 and a server 216 (e.g., an aircraft server). For example, the communication interface 208 can be configured to communicate directly with the server 216 (e.g., via an ad-hoc connection), or may be configured to communicate with the server 216 over a network (e.g., a wired/wireless network). In some embodiments, the aircraft server 216 is configured to request status information for one or more mechanical input devices 210 from the controller 202. The controller 202 may be configured to track the status of a mechanical input device 210 based on amount of use (e.g., direct interaction) in comparison to predetermined values for device lifetime or based on signal quality coming from the mechanical input device 210. The controller 202 may be configured to send the status information to the server 216 upon request or according to a schedule. In this manner, the server 216 can keep track of status information for the mechanical input devices 210 so that knobs, switches, buttons, and the like are replaced before they fail.

In embodiments, the server 216 includes a controller 218, memory 220, and a communication interface 222. The controller 218 provides processing functionality for at least the server 216 and can include any number of processors, micro-controllers, circuitry, field programmable gate array (FPGA) or other processing systems, and resident or external memory for storing data, executable code, and other information accessed or generated by the server 216. The controller 218 can execute one or more software programs embodied in a non-transitory computer readable medium (e.g., memory 220) that implement techniques described herein. The controller 218 is not limited by the materials from which it is formed or the processing mechanisms employed therein and, as such, can be implemented via semiconductor(s) and/or transistors (e.g., using electronic integrated circuit (IC) components), and so forth.

The memory 220 can be an example of tangible, computer-readable storage medium that provides storage functionality to store various data and/or program code associated with operation of the server 216/controller 218, such as software programs and/or code segments, or other data to instruct the controller 218, and possibly other components of the server 216, to perform the functionality described herein. Thus, the memory 220 can store data, such as a program of instructions for operating the server 216, including its components (e.g., controller 218, communication interface 222, etc.), and so forth. It should be noted that while a single memory 220 is described, a wide variety of types and combinations of memory (e.g., tangible, non-transitory memory) can be employed. The memory 220 can be integral with the controller 218, can comprise stand-alone memory, or can be a combination of both. Some examples of the memory 220 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 222 can be operatively configured to communicate with components of the server 216. For example, the communication interface 222 can be configured to retrieve data from the controller 218 or other devices (e.g., controller 202), transmit data for storage in the memory 220, retrieve data from storage in the memory 220, and so forth. The communication interface 222 can also be communicatively coupled with the controller 218 to facilitate data transfer between components of the server 216 and the controller 218. It should be noted that while the communication interface 222 is described as a component of the server 216, one or more components of the communication interface 222 can be implemented as external components communicatively coupled to the server 216 via a wired and/or wireless connection. The server 216 can also include and/or connect to one or more input/output (I/O) devices (e.g., via the communication interface 222), such as display system 214, an input device (e.g., a mouse, a trackball, a trackpad, a joystick, a line select device, a touchpad, a touchscreen, a keyboard, a keypad, a microphone (e.g., for voice commands)), and so forth. In embodiments, the communication interface 222 includes or is coupled to a transmitter, receiver, transceiver, physical connection interface, or any combination thereof.

FIG. 5 illustrates an example implementation of a method 300 that employs a control system, such as the control system 200 described herein, to facilitate touchless operation of one or more mechanical input devices 210. In general, operations of disclosed processes (e.g., method 300) may be performed in an arbitrary order, unless otherwise provided in the claims. Furthermore, the method 300 may include any step or operation implied or required by the embodiments of the control system 200 described herein.

The method 300 includes tracking user hand and finger movements with one or more RADAR sensors 212 (block 302). For example, one or more RADAR sensors 212 in proximity to (e.g., near, adjacent to, or at least partially integrated within a structure of) one or more mechanical input devices 210 can be used to detect movements of at least one hand and/or the fingers of at least one hand. The hand and/or finger movements can correspond to user actions/gestures for interfacing with at least one mechanical input device 210.

In some implementations, the method 300 includes detecting a gesture that indicates a user selection of a mechanical input device 210 based on the user hand and finger movements tracked by the one or more RADAR sensors 212 (block 304). For example, the RADAR sensors 212 can be configured to detect one or more fingers pointing at the mechanical input device 210. In an example scenario, a user can point at mechanical input device 210B. The controller 202 may be configured to detect the user selection of mechanical input device 210B based upon signal from RADAR sensor 212B and/or a comparison between signals from RADAR sensor 212B and one or more other RADAR sensors (e.g., RADAR sensors 212A and 212C that are associated with other mechanical input devices 210A and 210C, respectively).

Figure 5A:
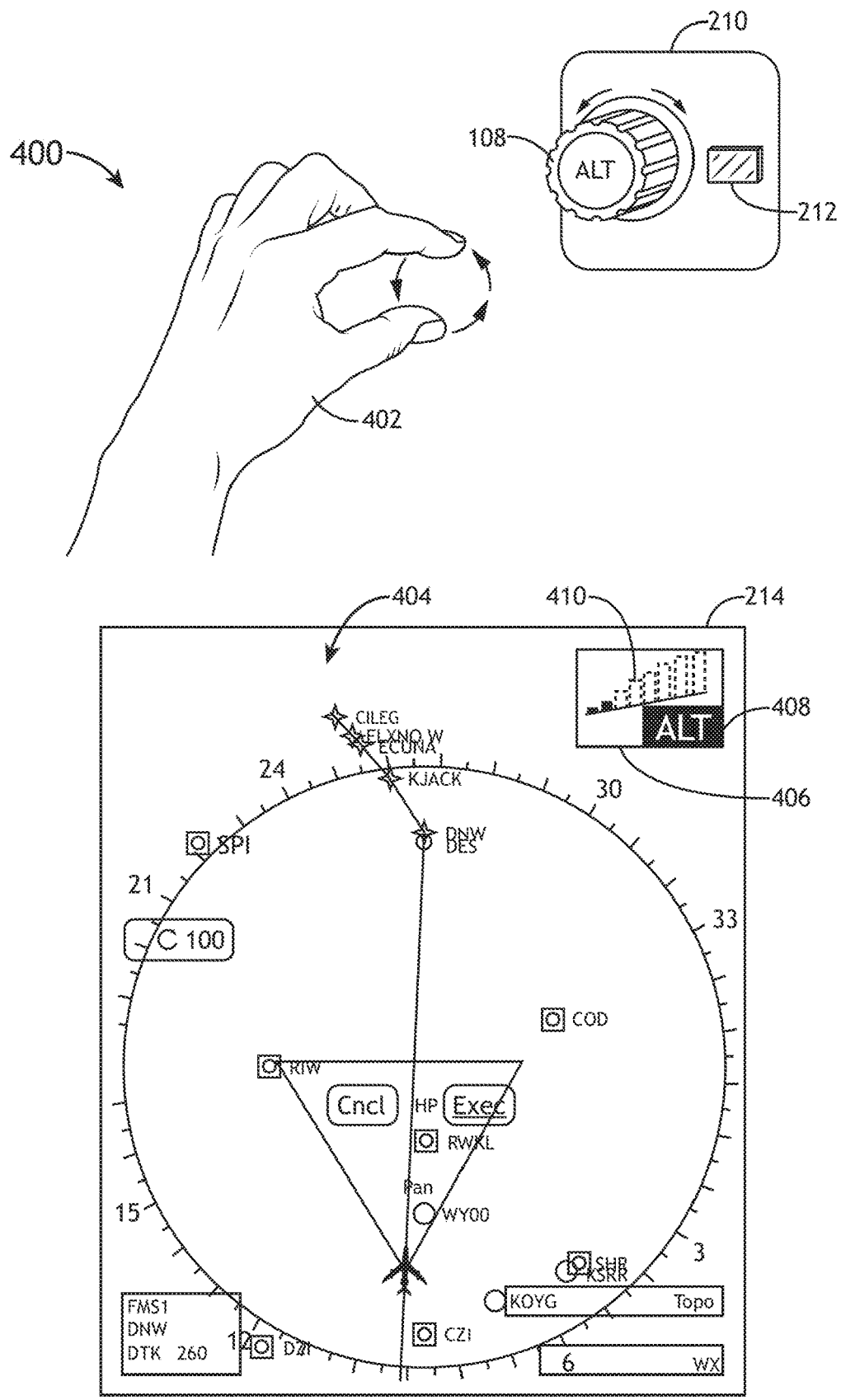
FIG. 5A is an illustration of a user hand gesture for interacting with a RADAR sensor of a control system for touchless operation of a mechanical input device, such as the control system illustrated in FIGS. 2A and 2B, in accordance with example embodiments of this disclosure.
Figure 5B:
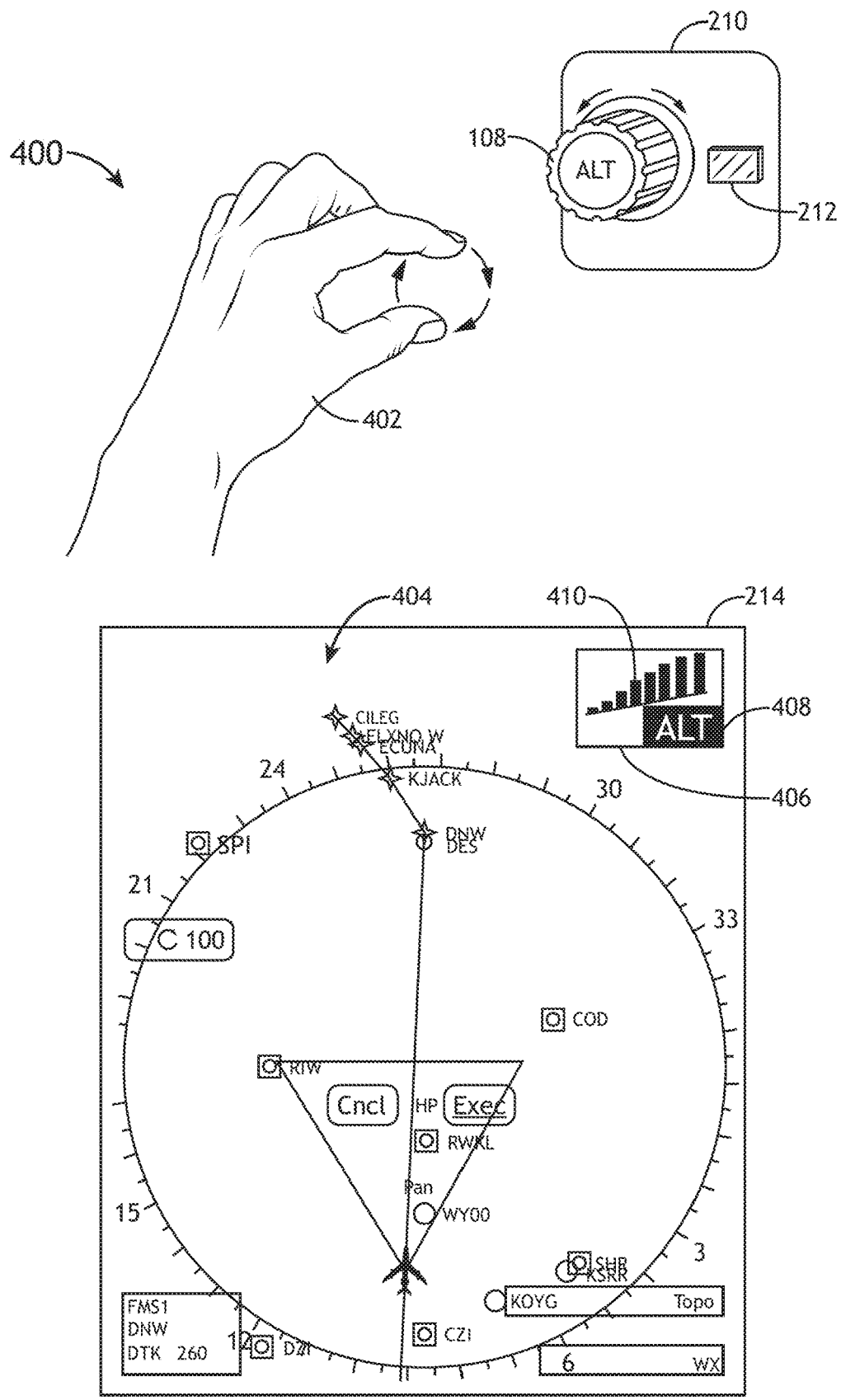
FIG. 5B is an illustration of a user hand gesture for interacting with a RADAR sensor of a control system for touchless operation of a mechanical input device, such as the control system illustrated in FIGS. 2A and 2B, in accordance with example embodiments of this disclosure.
Figure 6A:
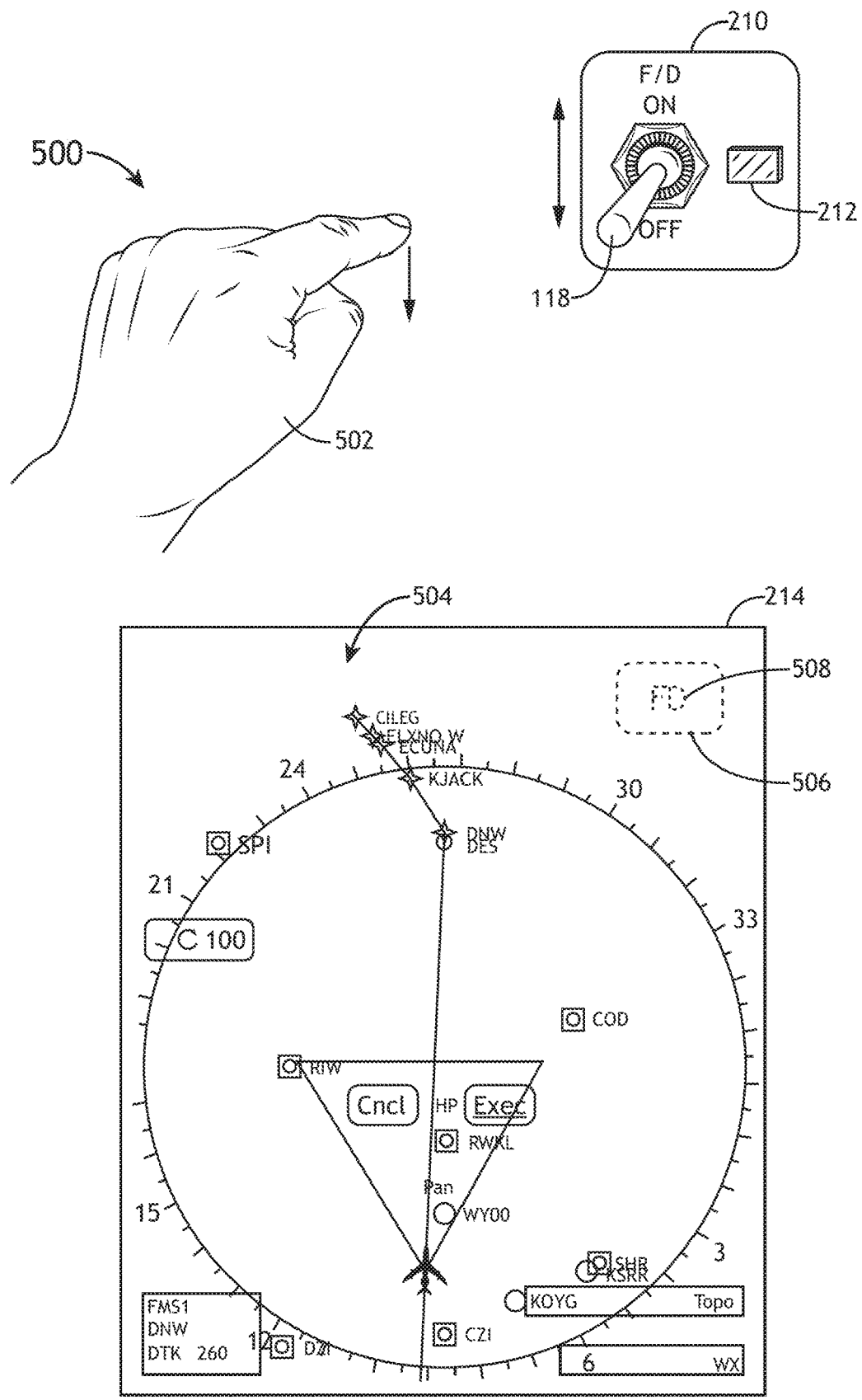
FIG. 6A is an illustration of a user hand gesture for interacting with a RADAR sensor of a control system for touchless operation of a mechanical input device, such as the control system illustrated in FIGS. 2A and 2B, in accordance with example embodiments of this disclosure.
Figure 6B:
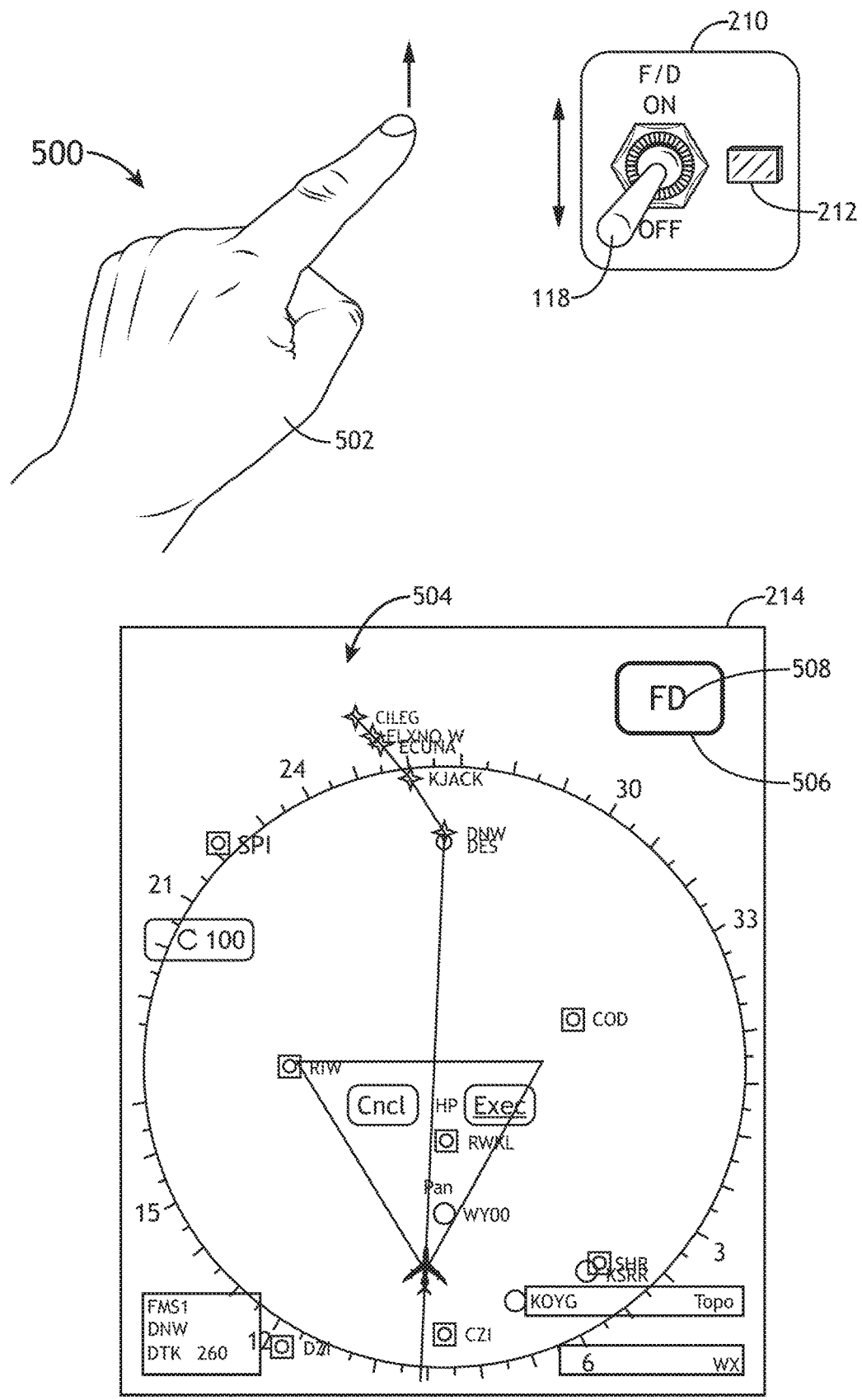
FIG. 6B is an illustration of a user hand gesture for interacting with a RADAR sensor of a control system for touchless operation of a mechanical input device, such as the control system illustrated in FIGS. 2A and 2B, in accordance with example embodiments of this disclosure.
Figure 7A:
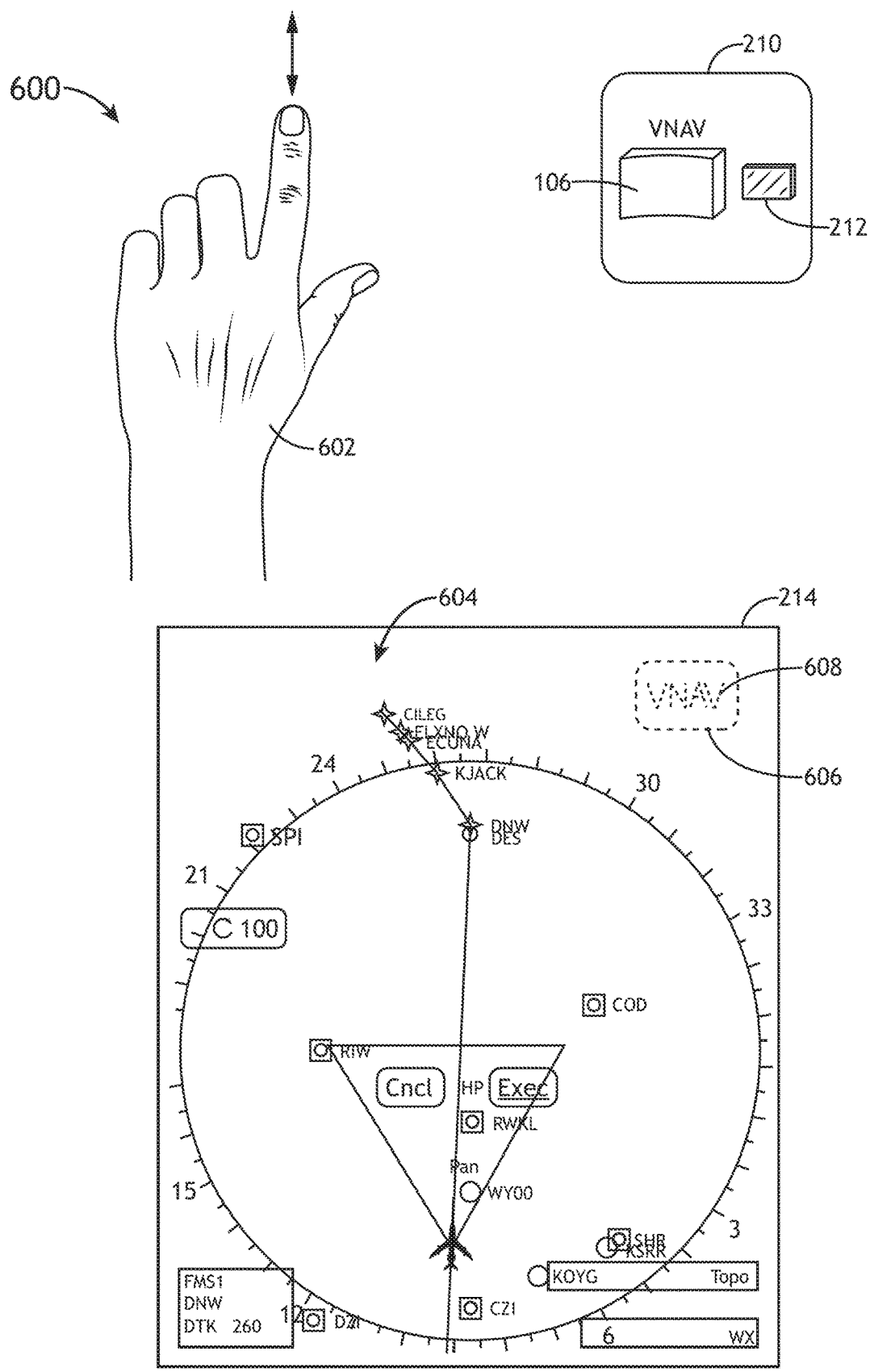
FIG. 7A is an illustration of a user hand gesture for interacting with a RADAR sensor of a control system for touchless operation of a mechanical input device, such as the control system illustrated in FIGS. 2A and 2B, in accordance with example embodiments of this disclosure.
Figure 7B:
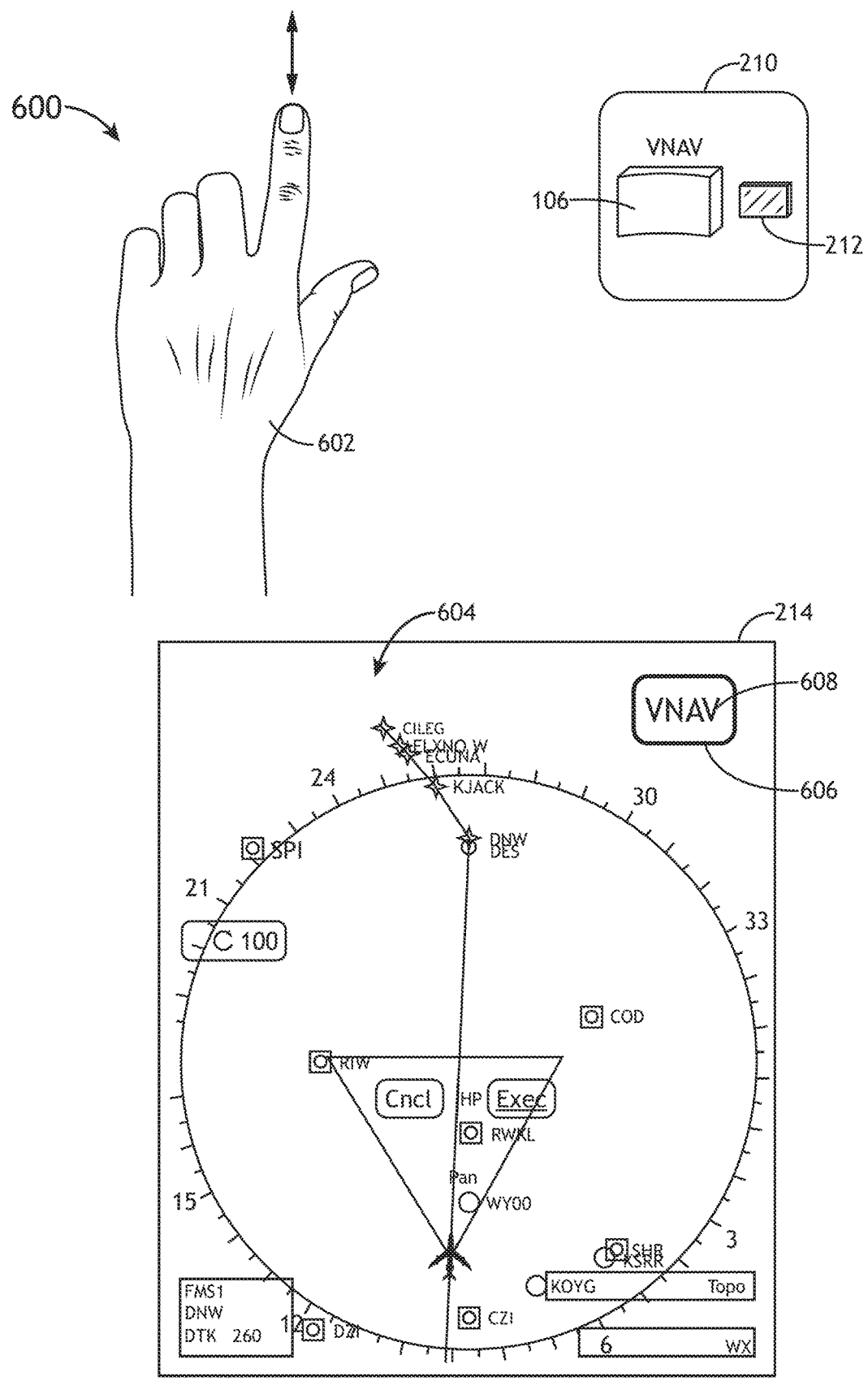
FIG. 7B is an illustration of a user hand gesture for interacting with a RADAR sensor of a control system for touchless operation of a mechanical input device, such as the control system illustrated in FIGS. 2A and 2B, in accordance with example embodiments of this disclosure.

The one or more RADAR sensors 212 are used to detect a gesture indicating a user action corresponding to a manipulation of the mechanical input device 210 (e.g., the selected mechanical input device and/or mechanical input device associated with a particular RADAR sensor 212) based on the user hand and finger movements tracked by the one or more RADAR sensors 212 (block 306). Several example scenarios are illustrated in FIGS. 5A through 7B. For example, FIGS. 5A and 5B illustrate an example environment 400 where the RADAR sensor 212 for a mechanical input device 210 (e.g., a knob 108) is configured to detect hand and/or finger movements 402 for a gesture that indicates turning a knob clockwise or counter clockwise. FIGS. 6A and 6B illustrate another example environment 500 where the RADAR sensor 212 for a mechanical input device 210 (e.g., a toggle switch 118) is configured to detect hand and/or finger movements 502 for a gesture that indicates flipping a toggle switch from one state (e.g., ON/OFF) to another state (e.g., OFF/ON). FIGS. 7A and 7B illustrate yet another example environment 600 where the RADAR sensor 212 for a mechanical input device 210 (e.g., a pushbutton switch 106) is configured to detect hand and/or finger movements 602 for a gesture that indicates pressing a button. The scenarios illustrated in FIGS. 5A through 7B are non-limiting examples of gestures that indicate user actions for manipulating selected mechanical input devices 210. In general, the controller 202 can be configured to detect any gesture indicating a user action that corresponds to a manipulation of a selected mechanical input device 210 based on the user hand and/or finger movements tracked by one or more RADAR sensors 212.

A control signal can be generated based upon the user action (block 308). For example, the controller 202 may be configured to generate a control signal based upon a user action that corresponds to a manipulation of a selected mechanical input device 210 based on the user hand and/or finger movements tracked by one or more RADAR sensors 212. In implementations, the control signal corresponds to the mechanical input device 210 and can have the same effect that directly engaging the mechanical input device 210 would have had on the system.

In some implementations, the method 300 also includes providing visual feedback based upon the user action corresponding to the manipulation of the mechanical input device 210 (block 310). For example, the controller 202 can be configured to display symbolic and/or textual information corresponding to the mechanical input device 210 (e.g., an indication of the selected mechanical input device 210) via the display system 214 (e.g., via display 102 or 104). In some implementations, the controller 202 is also configured to display symbolic and/or textual information corresponding the user action via the display system 214 (e.g., via display 102 or 104). For example, FIGS. 5A and 5B illustrate an example environment 400 where a display output 404 (e.g., a graphical user interface) includes a window 406 with text 408 associated with the mechanical input device 210 (e.g., the knob 108) and a dynamic symbolic output 410 (e.g., shaded bars) associated with the user action of turning a knob clockwise or counter clockwise. FIGS. 6A and 6B illustrate another example environment 500 where a display output 504 (e.g., a graphical user interface) includes a dynamic window 506 with text 508 associated with the mechanical input device 210 (e.g., the toggle switch 118), where the dynamic window 506 and text 508 transition between solid and dashed representations to indicate the user action of flipping a toggle switch from one state (e.g., ON/OFF) to another state (e.g., OFF/ON). FIGS. 7A and 7B illustrate yet another example environment 600 where a display output 604 (e.g., a graphical user interface) includes a dynamic window 606 with text 608 associated with the mechanical input device 210 (e.g., the pushbutton switch 106), where the dynamic window 606 and text 608 transition between solid and dashed representations to indicate the user action of pressing/depressing a button. The scenarios illustrated in FIGS. 5A through 7B are non-limiting examples of visual feedback that can be provided for the user in relation to a detected gesture indicating a user action that corresponds to a manipulation of a selected mechanical input device 210 based on the user hand and/or finger movements tracked by one or more RADAR sensors 212. In general, the controller 202 can be configured to provide visual feedback (e.g., via the display system 214) for any gesture indicating a user action that corresponds to a manipulation of a selected mechanical input device 210 based on the user hand and/or finger movements tracked by one or more RADAR sensors 212.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A control system for touchless operation of mechanical input devices, comprising:
   a plurality of mechanical input devices, wherein the plurality of mechanical input devices includes at least one of a knob, a dial, a slider, a joystick, a toggle switch, a pushbutton switch, or a selector switch;
   a plurality of RADAR sensors in proximity to the plurality of mechanical input devices, the plurality of RADAR sensors configured to track user hand and finger movements; and
   a controller in communication with the plurality of mechanical input devices and the plurality of RADAR sensors, the controller configured to:
      detect a first gesture indicating a user selection of a mechanical input device of the plurality of mechanical input devices based on the user hand and finger movements tracked by the plurality of RADAR sensors;
      detect a second gesture indicating a user action corresponding to a manipulation of the selected mechanical input device based on the user hand and finger movements tracked by the plurality of RADAR sensors; and
      generate a control signal based upon the user action, wherein respective ones of the plurality of RADAR sensors are disposed adjacent to respective ones of the plurality of mechanical input devices, wherein respective ones of the plurality of RADAR sensors form portions of respective ones of the plurality of mechanical input devices, the controller is configured to compare signal components, the signal components include x, y, and z components, of RADAR signals from the plurality of RADAR sensors, the controller is configured to compare the RADAR signals of a first RADAR sensor associated with a first mechanical input device with the RADAR signals of a second RADAR sensor associated with a second mechanical input device in order to detect the first gesture or second gesture corresponding with the second mechanical input device.

2. The control system of claim 1, further comprising a display in communication with the controller, wherein the controller is further configured to provide visual feedback based upon the selected mechanical input device and the user action corresponding to the manipulation of the selected mechanical input device via the display.

3. The control system of claim 2, wherein the visual feedback includes at least one of symbolic or textual information corresponding to the selected mechanical input device.

4. The control system of claim 3, wherein the visual feedback further includes at least one of symbolic or textual information corresponding to the user action.

5. A method for touchless operation of a mechanical input device, comprising:
   tracking user hand and finger movements with one or more RADAR sensors;
   detecting a first gesture indicating a user selection of a mechanical input device based on the user hand and finger movements tracked by the one or more RADAR sensors, the one or more RADAR sensors are at least partially integrated within a structure of the mechanical input device, wherein the mechanical input device includes at least one of a knob, a dial, a slider, a joystick, a toggle switch, a pushbutton switch, or a selector switch;

detecting a second gesture indicating a user action corresponding to a manipulation of the mechanical input device based on the user hand and finger movements tracked by the one or more RADAR sensors; and generating a control signal based upon the user action, wherein detecting the second gesture includes comparing signal components, the signal components include x, y, and z components, of RADAR signals from the one or more RADAR sensors, the detecting the second gesture includes comparing the RADAR signals of a first RADAR sensor associated with a first mechanical input device with the RADAR signals of a second RADAR sensor associated with a second mechanical input device in order to determine the user action corresponding with the second mechanical input device.

6. The method of claim 5, further comprising:

providing visual feedback based upon the user action corresponding to the manipulation of the mechanical input device.

7. The method of claim 6, wherein providing the visual feedback based upon the user action corresponding to the manipulation of the mechanical input device includes:

displaying at least one of symbolic or textual information corresponding to the mechanical input device.

8. The method of claim 7, wherein providing the visual feedback based upon the user action corresponding to the manipulation of the mechanical input device further includes:

displaying at least one of symbolic or textual information corresponding to the user action.

\* \* \* \* \*